(12) United States Patent
Smich et al.

(10) Patent No.: US 11,585,686 B2
(45) Date of Patent: Feb. 21, 2023

(54) DIRECTION SELECTIVE UNIDIRECTIONAL CLUTCH ASSEMBLY FOR A FLUID METER COUNTER MODULE ASSEMBLY AND A FLUID METER WITH A DIRECTION SELECTIVE UNIDIRECTIONAL CLUTCH ASSEMBLY

(71) Applicant: ROMET LIMITED, Mississauga (CA)

(72) Inventors: Andrew Smich, Mississauga (CA); Xinmin Wang, Mississauga (CA)

(73) Assignee: ROMET LIMITED, Mississauga (CA)

( * ) Notice: Subject to any disclaimer, the term of this patent is extended or adjusted under 35 U.S.C. 154(b) by 656 days.

(21) Appl. No.: 16/715,452

(22) Filed: Dec. 16, 2019

(65) Prior Publication Data
US 2020/0400468 A1    Dec. 24, 2020

Related U.S. Application Data

(60) Provisional application No. 62/864,045, filed on Jun. 20, 2019.

(51) Int. Cl.
*G01F 1/07*    (2006.01)
*G01F 25/10*    (2022.01)

(52) U.S. Cl.
CPC ............ *G01F 1/07* (2013.01); *G01F 25/15* (2022.01)

(58) Field of Classification Search
CPC ............ G01F 1/07; G01F 21/15; G01F 25/15
See application file for complete search history.

(56) References Cited

U.S. PATENT DOCUMENTS

| 2,810,298 | A  |   | 10/1957 | Thoresen |          |
|-----------|----|---|---------|----------|----------|
| 8,789,413 | B2 | * | 7/2014  | Grzeslo  | G01F 3/10 |
|           |    |   |         |          | 73/261   |
| 2009/0078523 | A1 | | 3/2009 | Grzeslo et al. | |

FOREIGN PATENT DOCUMENTS

NL    2008402    9/2013

OTHER PUBLICATIONS

International Search Report dated Feb. 28, 2020 For Corresponding International PCT Patent Application No. PCT/CA2019/051817; 3 Pages.
Written Opinion dated Feb. 28, 2020 For Corresponding International PCT Patent Application No. PCT/CA2019/051817; 4 Pages.

* cited by examiner

*Primary Examiner* — Erika J. Villaluna

(57) ABSTRACT

A direction selective unidirectional clutch assembly for a fluid meter counter module assembly is characterized by a drive selector mechanism to couple a direction selection drive shaft to a unidirectional clutch to select one of a first flow direction and a second flow direction of flow of the fluid to drive a counter module. The direction selection draft is coupled to a rotating member (e.g. impeller) driven by flow of the fluid and rotates in a direction that is responsive to the direction of rotation of the rotating member. A pair of gears are mounted to slide along the direction selection draft between a first position and a second position. A direction changing gear is mounted at the second position. Further provided is a flow meter with a direction selective unidirectional clutch assembly.

20 Claims, 3 Drawing Sheets

DIRECTION SELECTIVE UNIDIRECTIONAL CLUTCH ASSEMBLY FOR A FLUID METER COUNTER MODULE ASSEMBLY AND A FLUID METER WITH A DIRECTION SELECTIVE UNIDIRECTIONAL CLUTCH ASSEMBLY

CROSS-REFERENCE

This application claims the domestic benefit of U.S. Provisional Application No. 62/864,045 filed Jun. 20, 2019, the content of which is incorporated in its entirety.

FIELD

The subject matter herein relates to fluid flow equipment such as gas meters and more particularly to a direction selective unidirectional clutch assembly for a fluid meter counter module assembly and a fluid meter with a direction selective unidirectional clutch assembly.

BACKGROUND

Gas meters, particularly for industrial use, include measurement devices to measure large volumes of gas. A gas meter pressure body converts gas flow into rotational motion via two solid impellers. As a result of their fixed orientation and swept volumes, when the impellers are driven by a gas flow, the impellers only allow a set volume of gas to pass through the meter on each rotation. Accordingly, the quantity of gas passing through the meter can be calculated by counting the number of rotations of at least one of the impellers. A counter module may be driven by the rotation of the impellers. Flow through a meter may become interrupted or temporarily reversed during normal operation of the meter, which can lead to reverse rotation of the impellers. Also, a meter may be installed for a reverse flow. Therefore a direction of rotation may affect the counting.

U.S. Pat. No. 8,789,413B2 issued Jul. 29, 2014 discloses a unidirectional clutch assembly to drive a counter for a positive displacement rotary gas meter. The unidirectional clutch assembly disclosed therein may be used to drive a counter using only rotations in a single, desired direction. The clutch assembly may be installed at manufacturing to be responsive to only the one desired direction, for example, for only forward flow or only reverse flow counting. At manufacture, the counting direction is fixed such that a forward flow meter cannot count fluid in a reverse flow and vice versa.

It may be desired to mount a meter with flow in a first direction and then reuse the meter in a second installation with a flow in the reverse direction. Thus may be desired to set or reset the flow direction of the counting in a fluid flow meter having a unidirectional clutch.

SUMMARY

Often, a fluid (e.g. gas) meter, once installed, must measure a flow of fluid in one direction only but the particular direction may not be known prior to installation or may switch such as in response to a second installation. The present disclosure provides a counter which may be configured to count only in either one of two directions and which is easy to configure at installation. A fluid flow meter with such a counter is more versatile in its ability to be mounted for flows in either of the directions. Further a known unidirectional clutch assembly may be adapted with forward/reverse gearing to selectively choose the direction of fluid flow that activates a counter module.

There is provided a direction selective unidirectional clutch assembly for a fluid meter counter module assembly that is characterized by a drive selector mechanism to couple a direction selection drive shaft to a unidirectional clutch to select one of a first flow direction and a second flow direction of flow of the fluid to drive a counter module. The direction selection draft is coupled to a rotating member (e.g. impeller) driven by flow of the fluid and rotates in a direction that is responsive to the direction of rotation of the rotating member. A pair of gears are mounted to slide along the direction selection draft between a first position and a second position. A direction changing gear is mounted at the second position. Further provided is a flow meter with a direction selective unidirectional clutch assembly.

There is provided a direction selective unidirectional clutch assembly for a fluid meter counter module assembly. The direction selective unidirectional clutch assembly comprises: a unidirectional clutch to selectively couple to and decouple from a driven shaft to drive a counter module, the unidirectional clutch selectively coupling to the driven shaft in response to rotation of a unidirectional clutch drive shaft in a first direction to activate the counter module for counting and selectively decoupling from the driven shaft in response to rotation of a unidirectional clutch drive shaft in a second direction to inhibit the counter module from counting; a direction selection drive shaft configured to rotate in response to a flow of fluid in the fluid meter, the direction selection drive shaft rotating in one direction in response to the flow of fluid in a first flow direction through the flow meter and rotating in an opposite direction to the one direction in response to the flow of fluid in a second flow direction; and a drive selector mechanism to couple the direction selection drive shaft to the unidirectional clutch to select one of the first flow direction and the second flow direction of flow of the fluid to active the counter module.

The drive selector mechanism may be mounted for movement between a first position and a second position along one of the unidirectional clutch drive shaft and the direction selection drive shaft; and, wherein: when in the first position, the drive selector mechanism couples the direction selection drive shaft to the unidirectional clutch drive shaft for activating the counter module in response to rotation of the direction selection drive shaft only in the one direction; and when in the second position, the drive selector mechanism couples the direction selection drive shaft to the unidirectional clutch drive shaft to activate the counter module in response to rotation of the direction selection drive shaft only in the opposite direction. The drive selector mechanism may comprise a first gear and a second gear combination mounted on one of the unidirectional clutch drive shaft and the direction selection drive shaft to move between the first position and the second position. The first gear combination and the second gear combination may be coupled to move together. A first drive gear may be mounted to the other of the unidirectional clutch drive shaft and the direction selection drive shaft to engage with the first gear of the drive selector mechanism when the first gear is in the first position. The drive selector mechanism may further comprise a direction changing gear to engage with the second gear when the second gear is in the second position. The direction changing gear may be mounted for rotation between the unidirectional clutch drive shaft and the direction selection drive shaft. A second drive gear may be mounted the other of the unidirectional clutch drive shaft and the direction selection drive shaft to engage with the direction changing gear.

The fluid meter may comprise a counter housing to house the direction selective unidirectional clutch assembly and the counter module, wherein the counter module comprises a mechanical counter and the counter housing comprises a window through which the mechanical counter is visible.

The fluid meter may be a gas meter.

There is provided a fluid meter with a direction selective unidirectional clutch assembly as shown and described.

Figure 1:
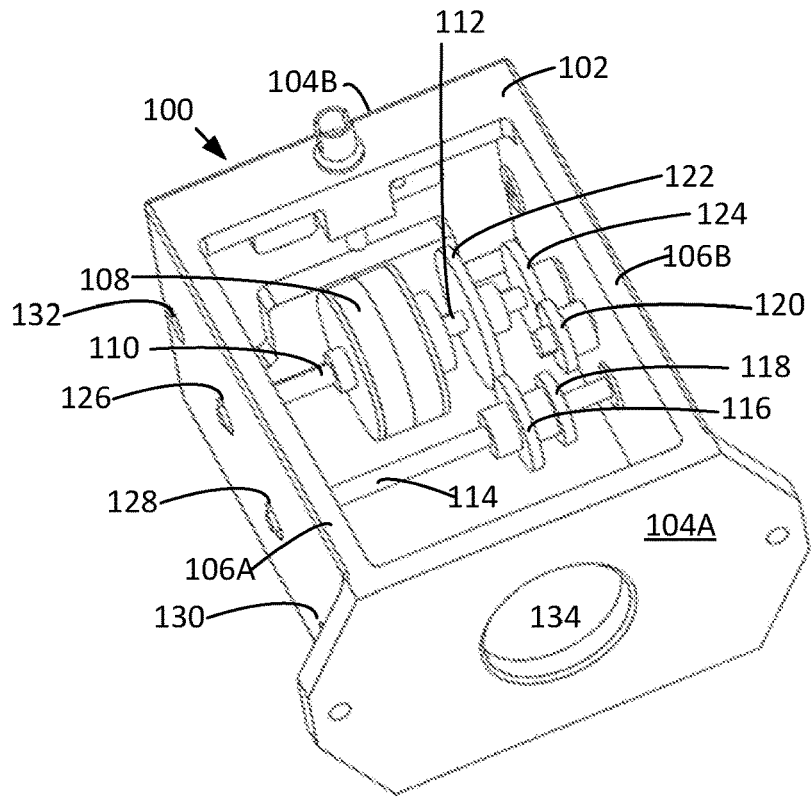
FIG. 1 is a perspective view of a unidirectional clutch assembly such as for driving a fluid meter counter module assembly in a fluid flow meter.

The present concept is best described through certain embodiments thereof, which are described herein with reference to the accompanying drawings, wherein like reference numerals refer to like features throughout. It is to be understood that the term invention, when used herein, is intended to connote the concept underlying the embodiments described below and not merely the embodiments themselves. It is to be understood further that the general concept is not limited to the illustrative embodiments described below and the following descriptions should be read in such light. More than one concept may be shown and described and each may standalone or be combined with one or more others unless stated otherwise.

DETAILED DESCRIPTION

Reference is directed to FIG. 1 where there is shown a perspective view of a unidirectional clutch assembly 100 such as for driving a fluid meter counter module assembly in a fluid flow meter. Assembly 100 comprises a housing 102 having opposed spaced ends 104A, 104B and opposed spaced sides 106A, 106B. Mounted in the housing 102 is a unidirectional clutch 108. Unidirectional clutch 108 may be configured as described in U.S. Pat. No. 8,789,413B2.

Figure 2:
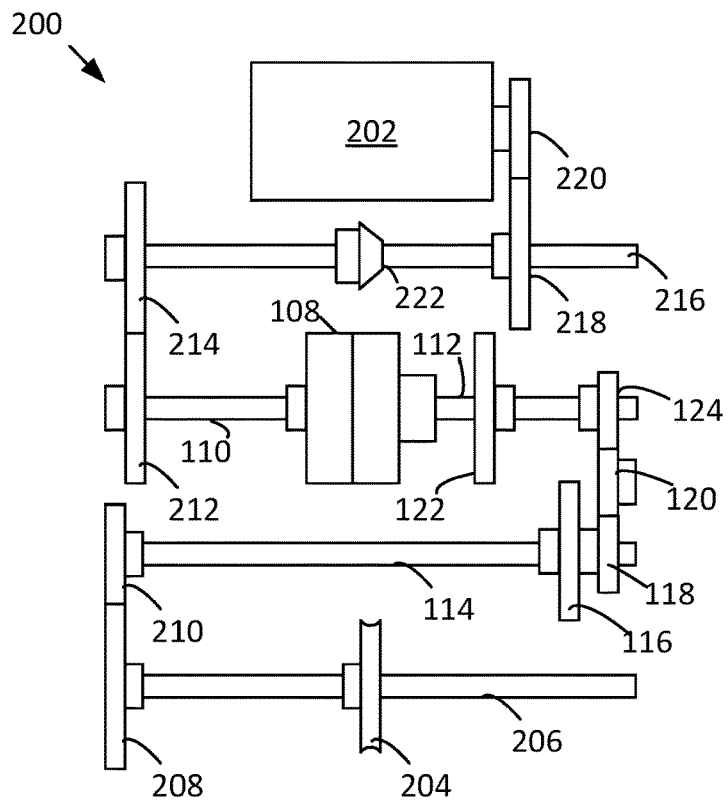
FIG. 2 is a top view of a simplified reduction gear train assembly for a unidirectional clutch assembly in accordance with FIG. 1.

Unidirectional clutch 108 selectively couples to and decouples from a driven drive shaft 110 (see FIG. 2), such as for driving a counter module. The counter module may comprise a mechanical counter (not shown). Coupling and decoupling by the unidirectional clutch 108 is selective in that it is responsive to a direction of rotation of a driving member for the unidirectional clutch 108. That is, unidirectional clutch 108 couples to the driven shaft 110 in response to rotation of a unidirectional clutch drive shaft 112 in a first direction to activate the counter module for counting and decouples from the driven shaft 110 in response to rotation of a unidirectional clutch drive shaft 112 in a second direction to inhibit the counter module from counting. Driven shaft 110 may drive the counter module (e.g. mechanical counter) indirectly as shown in FIG. 2 where FIG. 2 is a top view of a simplified reduction gear train assembly for a unidirectional clutch assembly in accordance with FIG. 1.

Also mounted in the housing is a direction selection drive shaft 114 configured to rotate in response to a flow of fluid in the fluid meter (not shown), the direction selection drive shaft 114 rotating in one direction in response to the flow of fluid in a first flow direction through the flow meter and rotating in an opposite direction to the one direction in response to the flow of fluid in a second flow direction. In a positive displacement rotary gas meter, direction selection drive shaft 114 may be coupled indirectly, for example using a worm drive, to a respective drive shaft (not shown) of the pair of impellers (not shown) such as further described with reference to FIG. 2.

Further mounted in the housing is a drive selector mechanism, comprising a plurality of components as further described, to couple direction selection drive shaft 114 to unidirectional clutch 108. The drive selector mechanism couples the direction selection drive shaft 114 to unidirectional clutch 108 to select one of the first flow direction and the second flow direction as the desired direction of flow of the fluid to active the counter module.

The drive selector mechanism position may be set such as at manufacture or installation to select the direction that drives the counting. The drive selector mechanism position may be reset, selectively as desired, to activate counting in an opposite direction, for example, in response to a subsequent installation where flow is in an opposite direction or even at a first installation if the drive selector mechanism position was previously set at an undesired position, etc. The drive selector mechanism position is set in one of the positions to measure the flow of fluid in the selected direction and not backward count the fluid in response to a reversal of the flow of the fluid should such occur. Though not shown, access to housing 102 is sealed such as during operation.

In the present example, the drive selector mechanism comprises a plurality of gears including a first gear 116, a second gear 118 and a direction changing gear 120 on or about unidirectional clutch drive shaft 112 and the direction selection drive shaft 114. FIG. 1 shows an example of the drive selector mechanism in accordance with one embodiment but it will be apparent to those of skill in the art that modifications may be made. For example, gears mounted to one of the unidirectional clutch drive shaft 112 and the direction selection drive shaft 114 may be swapped and mounted to the other of the unidirectional clutch drive shaft 112 and the direction selection drive shaft 114 such as further described.

FIG. 1 shows first gear 116 and second gear 118 mounted on direction selection drive shaft 114, to move (e.g. slide) axially there along between the first position and the second position. FIG. 1 shows first gear 116 and second gear 118 in the first position. FIG. 2 shows first gear 116 and second gear 118 in the second position. First gear 116 and second gear 118 are configured in a combination in that first gear 116 and the second gear 118 are coupled to move together. In this way the first gear 116 cannot be in the first position when the second gear 118 is in the second position. Though not shown, first gear 116 and second gear 118 may be coupled to direction selection drive shaft 114 via a positioning mechanism/position-locking mechanism. In an example, such a mechanism may comprise one or more set screws. The screw(s) may be loosened and first gear 116 and second gear 118 slide axially along direction selection drive shaft 114 to be located in one of the first position and the second position. The screw(s) may be tightened to hold first gear 116 and second gear 118 in place. In another example, the pair of gears 116 and 118 of the drive selector mechanism may be movable from the first position of FIG. 1 to the second position of FIG. 2 on the shaft 114 by means of a sliding and locking mechanism.

Direction changing gear 120 is mounted to engage with second gear 118 when the second gear is in the second position. Rotation of second gear 118 in one direction rotates direction changing gear 120 in a direction opposite to the one direction. Direction changing gear 120 is mounted for rotation between unidirectional clutch drive shaft 112 and the direction selection drive shaft 114. Direction changing gear 120 is mounted to housing 102.

In the assembly of FIG. 1 a first drive gear 122 is mounted to unidirectional clutch drive shaft 112 to engage with the first gear 116 of the drive selector mechanism when the first gear 116 is in the first position. Further, a second drive gear 124 is mounted to unidirectional clutch drive shaft 112 to engage with the direction changing gear 120 to be driven when the second gear 118 is in the second position. In the present example, first drive gear 122 and second drive gear 124 do not (e.g. are not intended to) move axially along unidirectional clutch drive shaft 112. It will be understood that the location of first drive gear 122 and second drive gear 124 may be swapped with the location of first gear 116 and second gear 118. That is, first drive gear 122 and second drive gear 124 may be mounted to one of unidirectional clutch drive shaft 112 and direction selection drive shaft 114 and first gear 116 and second gear 118 may be mounted to the other of unidirectional clutch drive shaft 112 and direction selection drive shaft 114.

The various gears 116, 118, 120, 122 and 124 are appropriately sized to engage with one another as shown and described. The grooves or teeth/spurs of the various gears 116, 118, 120, 122 and 124 herein are not shown in any of the drawings for simplicity. The various gears have respective collars such as for mounting to a respective shaft such as by using a set screw (not shown).

The various shafts and 110, 112 and 114 and direction changing gear 120 may be mounted by housing 102 through respective apertures (e.g. 126, 128) formed in sides 106A, 106B and may have bushings, etc. Though not shown in FIG. 1 for simplicity, further shafts (e.g. 206 and 216) and respective gears as shown in FIG. 2 may be mounted such as via apertures 130 and 132. End 104A defines an aperture 134 such as for receiving a coupling to an impeller drive shaft. The coupling may include a magnetic coupling as is known.

In the example of FIG. 1, unidirectional clutch 108 is mounted for driving in a parallel orientation to direction selection drive shaft 114. In an example, unidirectional clutch 108 may be mounted for driving in a transverse orientation to direction selection drive shaft 114 such as via an intermediate gear train (e.g. a pair of bevel gears, etc.), which may be coupled to unidirectional clutch drive shaft 122.

FIG. 2 illustrates a simplified reduction gear train assembly 200 in accordance with an example of FIG. 1, such as for driving a mechanical counter 202. It will be understood that the gears, etc. are not to scale per se and the gear reductions/gear ratio are not precisely shown.

Mechanical counter may be mounted outside housing 102, located at (and optionally on) end 104B. Assembly 200 shows worm gear 204 on a worm gear shaft 206. Worm gear 204 may be driven by a worm (not shown) turned by one of the impeller drive shafts. Shaft 206 turns gear 208 meshed with gear 210 to turn direction selection drive shaft 114. FIG. 2 shows first gear 116 and second gear 118 in the second position, engaging with direction changing gear 120.

Drive shaft 110 from unidirectional clutch 108 drives gear 212 engaged with gear 214 of a bevel gear shaft 216. Bevel gear shaft 216 drives gear 218 engaged (e.g. meshed) with counter drive gear 220 to drive the mechanical counter. Bevel gear shaft 216 also drives bevel gear 222 (the other half not shown) such as for driving a further mechanism or instrument (not shown in FIG. 2) such as another counting mechanism.

Figure 3:
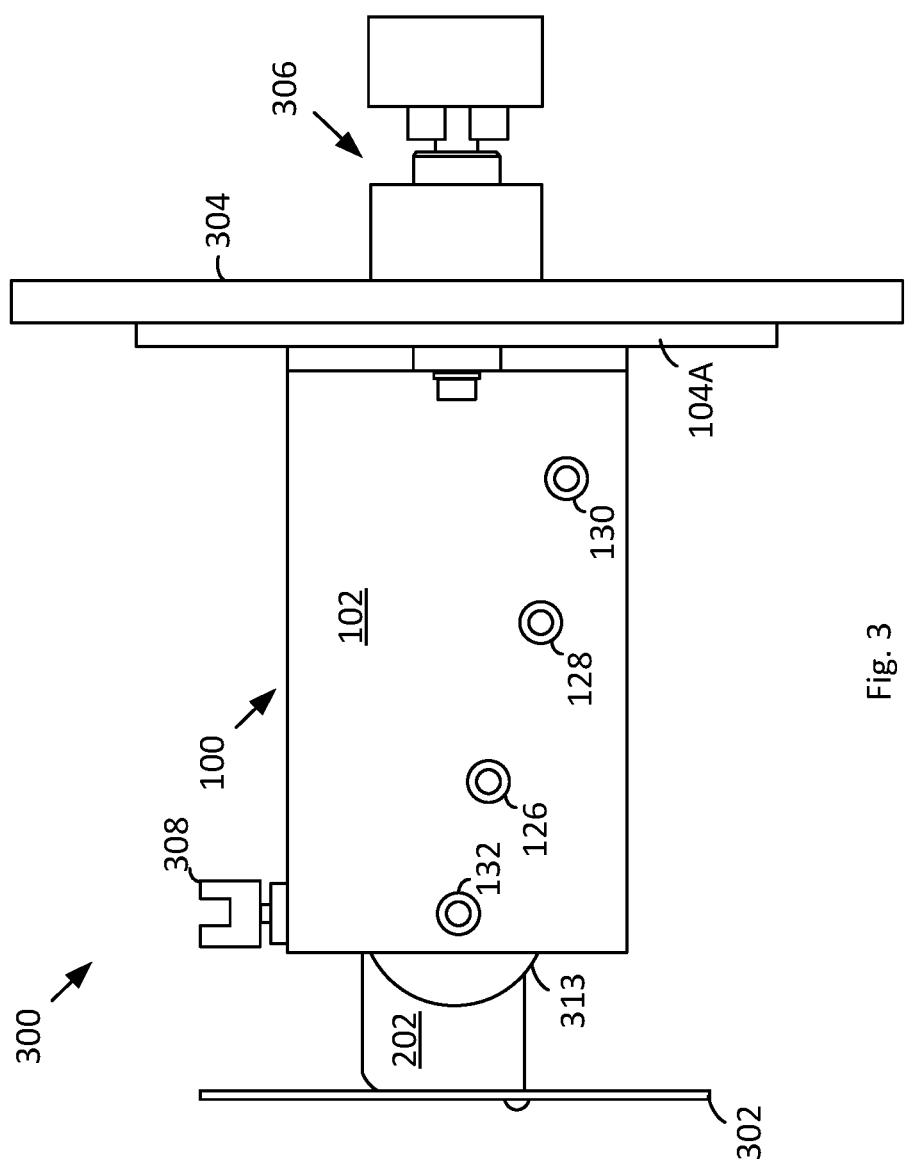
FIG. 3 is a side view of a counter unit assembly for a gas meter.

FIG. 3 is a side view of a fluid meter counter module assembly 300 for a fluid meter including a direction selective unidirectional clutch assembly 100. Assembly 300 shows, at one end, a face plate 302 for mechanical counter 202. Assembly 300 shows a mounting plate 304 and inner magnet shaft assembly 306 such as for coupling to an impeller drive shaft. Also shown is a drive dog 308 for an instrument (e.g. another counter module) that may be driven by bevel gear shaft 216 via bevel gear 222 and a second bevel gear (not shown).

Figure 4:
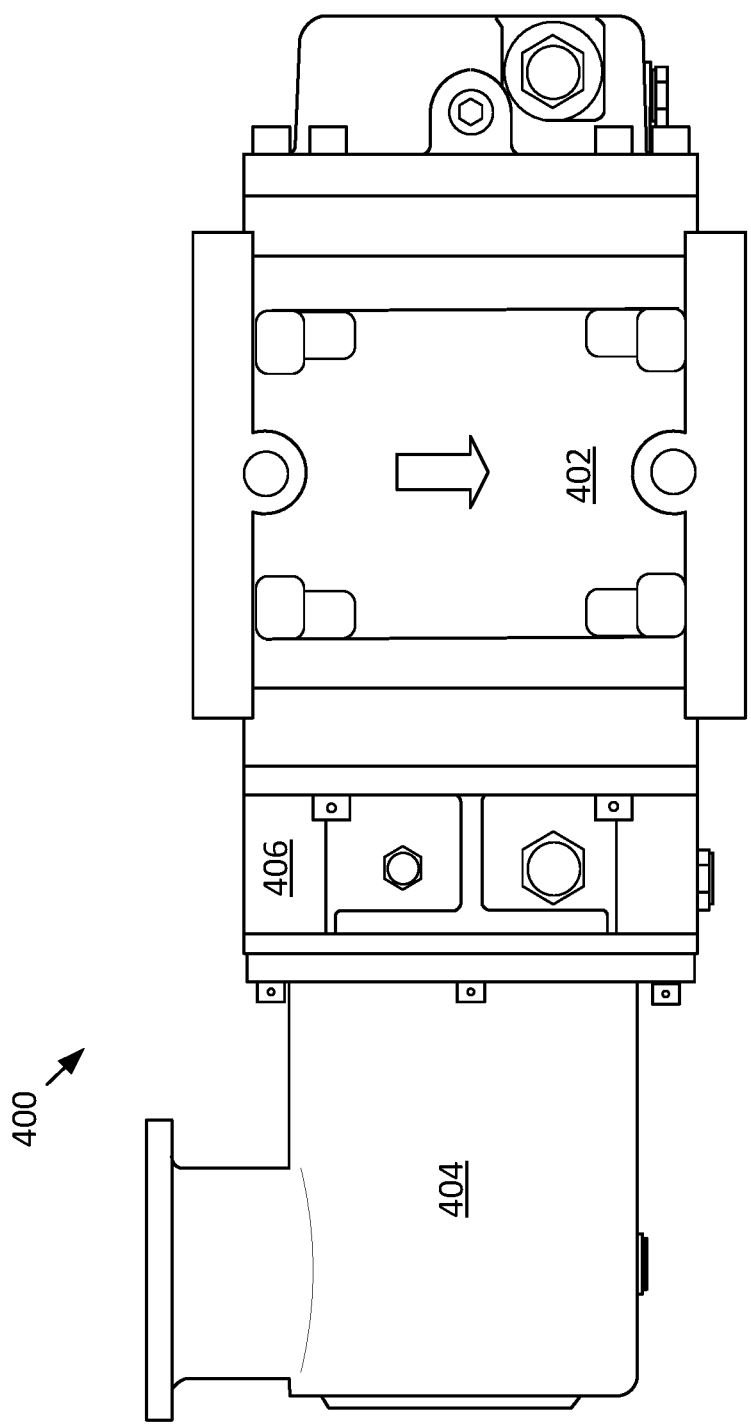
FIG. 4 is a side view of a gas meter.

FIG. 4 is a side view of a fluid meter 400 comprising a gas meter. Internally therein is fluid meter counter module assembly 300 including a direction selective unidirectional clutch assembly 100. Fluid meter 400 has a fluid meter pressure body 402, which houses the impellers (not shown). Fluid meter 400 has a counter housing 404. Internally to counter housing 404 is mounted the fluid meter counter module assembly 300 including unidirectional clutch assembly 100. Within housing 406 is the magnetic coupling assembly to the impellers.

Fluid (e.g. gas) typically flows though in the direction of the arrow. In accordance with the unidirectional clutch assembly 100, the assembly may be set to count flow in response to this direction, typically a forward direction, using the drive selector mechanism. For example first gear 116 may be set in the first position. Counter housing 404 may then be sealed. However, should a different installation be desired, whether as a first installation or a subsequent installation where volume is measured using a reverse flow direction, the drive selector mechanism may be used and the second gear set in the second position. Counter housing 404 may require opening and sealing.

Counter housing 404 protects the mechanical counter and its assembly as well as prevents tampering. Counter housing 404 may have a viewing window (not shown) through which the mechanical counter may be viewed such as at an end.

The gas meter may comprise a conventional positive displacement rotary gas meter. Examples include the AdEM and ECM2 models (e.g. sold under the trademarks AdEM-S, AdEM-T, AdEM-PTZ, ECM2-PTZ, etc.) available from Romet Limited. It should be understood that the assembly could be utilized with any type of gas meter. An opposite end of the gas meter (or other location) may comprise electronic components of an electronic compensator providing an electronic counter which counter compensates for changes in the density of the gas due to fluctuations in temperature, as flow data is being recorded.

In each of the examples described herein, whether illustrated or not, the components of the drive selector mechanism may be made of metal or a strong (e.g. resistant) plastic. A mechanical counter can be any commercially available counter (e.g. those manufactured by Veeder-Root Inc. of Connecticut, U.S.A.).

While the present description is being provided assuming that medium of natural gas, it should be understood that the positive displacement meter could be used to measure any type of gas or other fluid.

Practical implementation may include any or all of the features described herein. These and other aspects, features and various combinations may be expressed as methods, apparatus, systems, means for performing functions, program products, and in other ways, combining the features described herein. A number of embodiments have been described. Nevertheless, it will be understood that various modifications can be made without departing from the spirit and scope of the processes and techniques described herein. Accordingly, other embodiments are within the scope of the following claims.

Throughout the description and claims of this specification, the word "comprise" and "contain" and variations of them mean "including but not limited to" and they are not intended to (and do not) exclude other components, integers or steps. Throughout this specification, the singular encompasses the plural unless the context requires otherwise. In particular, where the indefinite article is used, the specification is to be understood as contemplating plurality as well as singularity, unless the context requires otherwise. Herein, "A and/or B" means A or B or both A and B.

Features, integers, characteristics, etc. described in conjunction with a particular aspect, embodiment or example of the invention herein are to be understood to be applicable to any other aspect, embodiment or example unless incompatible therewith. All of the features disclosed herein (including any accompanying claims, abstract and drawings), and/or all of the steps of any method or process so disclosed, may be combined in any combination, except combinations where at least some of such features and/or steps are mutually exclusive. The invention is not restricted to the details of any foregoing examples or embodiments. The invention extends to any novel one, or any novel combination, of the features disclosed in this specification (including any accompanying claims, abstract and drawings).

What is claimed is:

1. A direction selective unidirectional clutch assembly for a fluid meter counter module assembly, wherein the direction selective unidirectional clutch assembly comprises:
   a unidirectional clutch to selectively couple to and decouple from a driven shaft to drive a counter module, the unidirectional clutch selectively coupling to the driven shaft in response to rotation of a unidirectional clutch drive shaft in a first direction to activate the counter module for counting and selectively decoupling from the driven shaft in response to rotation of a unidirectional clutch drive shaft in a second direction to inhibit the counter module from counting;
   a direction selection drive shaft configured to rotate in response to a flow of fluid in the fluid meter, the direction selection drive shaft rotating in one direction in response to the flow of fluid in a first flow direction through the flow meter and rotating in an opposite direction to the one direction in response to the flow of fluid in a second flow direction;
   a drive selector mechanism to couple the direction selection drive shaft to the unidirectional clutch to select one of the first flow direction and the second flow direction of flow of the fluid to activate the counter module.

2. The direction selective unidirectional clutch assembly of claim 1 wherein the drive selector mechanism is mounted for movement between a first position and a second position along one of the unidirectional clutch drive shaft and the direction selection drive shaft; and, wherein:
   when in the first position, the drive selector mechanism couples the direction selection drive shaft to the unidirectional clutch drive shaft for activating the counter module in response to rotation of the direction selection drive shaft only in the one direction; and
   when in the second position, the drive selector mechanism couples the direction selection drive shaft to the unidirectional clutch drive shaft to activate the counter module in response to rotation of the direction selection drive shaft only in the opposite direction.

3. The direction selective unidirectional clutch assembly of claim 2 wherein the drive selector mechanism comprises a first gear and a second gear combination mounted on one of the unidirectional clutch drive shaft and the direction selection drive shaft to move between the first position and the second position.

4. The direction selective unidirectional clutch assembly of claim 3 wherein the first gear combination and the second gear combination are coupled to move together.

5. The direction selective unidirectional clutch assembly of claim 3 wherein a first drive gear is mounted to the other of the unidirectional clutch drive shaft and the direction selection drive shaft to engage with the first gear of the drive selector mechanism when the first gear is in the first position.

6. The direction selective unidirectional clutch assembly of claim 3 wherein the drive selector mechanism further comprises a direction changing gear to engage with the second gear when the second gear is in the second position.

7. The direction selective unidirectional clutch assembly of claim 6 wherein the direction changing gear is mounted for rotation between the unidirectional clutch drive shaft and the direction selection drive shaft.

8. The direction selective unidirectional clutch assembly of claim 6 wherein a second drive gear is mounted the other of the unidirectional clutch drive shaft and the direction selection drive shaft to engage with the direction changing gear.

9. The direction selective unidirectional clutch assembly of claim 1 wherein the fluid meter comprises a counter housing to house the direction selective unidirectional clutch assembly and the counter module, wherein the counter module comprises a mechanical counter and the counter housing comprises a window through which the mechanical counter is visible.

10. The direction selective unidirectional clutch assembly of claim 1 wherein the fluid meter is a gas meter.

11. A fluid meter with a direction selective unidirectional clutch assembly wherein the direction selective unidirectional clutch assembly comprises:
   a unidirectional clutch to selectively couple to and decouple from a driven shaft to drive a counter module, the unidirectional clutch selectively coupling to the driven shaft in response to rotation of a unidirectional clutch drive shaft in a first direction to activate the counter module for counting and selectively decoupling from the driven shaft in response to rotation of a unidirectional clutch drive shaft in a second direction to inhibit the counter module from counting;
   a direction selection drive shaft configured to rotate in response to a flow of fluid in the fluid meter, the direction selection drive shaft rotating in one direction in response to the flow of fluid in a first flow direction through the flow meter and rotating in an opposite direction to the one direction in response to the flow of fluid in a second flow direction;
   a drive selector mechanism to couple the direction selection drive shaft to the unidirectional clutch to select one of the first flow direction and the second flow direction of flow of the fluid to activate the counter module.

12. The fluid meter of claim 11 wherein the drive selector mechanism is mounted for movement between a first position and a second position along one of the unidirectional clutch drive shaft and the direction selection drive shaft; and, wherein:

when in the first position, the drive selector mechanism couples the direction selection drive shaft to the unidirectional clutch drive shaft for activating the counter module in response to rotation of the direction selection drive shaft only in the one direction; and when in the second position, the drive selector mechanism couples the direction selection drive shaft to the unidirectional clutch drive shaft to activate the counter module in response to rotation of the direction selection drive shaft only in the opposite direction.

13. The fluid meter of claim 12 wherein the drive selector mechanism comprises a first gear and a second gear combination mounted, on one of the unidirectional clutch drive shaft and the direction selection drive shaft, to move between the first position and the second position.

14. The fluid meter of claim 13 wherein the first gear combination and the second gear combination are coupled to move together.

15. The fluid meter of claim 13 wherein a first drive gear is mounted to the other of the unidirectional clutch drive shaft and the direction selection drive shaft to engage with the first gear of the drive selector mechanism when the first gear is in the first position.

16. The fluid meter of claim 13 wherein the drive selector mechanism further comprises a direction changing gear to engage with the second gear when the second gear is in the second position.

17. The fluid meter of claim 16 wherein the direction changing gear is mounted for rotation between the unidirectional clutch drive shaft and the direction selection drive shaft.

18. The fluid meter of claim 16 wherein a second drive gear is mounted the other of the unidirectional clutch drive shaft and the direction selection drive shaft to engage with the direction changing gear.

19. The fluid meter of claim 11 wherein the fluid meter comprises a counter housing to house the direction selective unidirectional clutch assembly and the counter module, wherein the counter module comprises a mechanical counter and the counter housing comprises a window through which the mechanical counter is visible.

20. The fluid meter of claim 11 wherein the fluid meter is a gas meter.

* * * * *